United States Patent [19]

Basmajian et al.

[11] 4,216,593
[45] Aug. 12, 1980

[54] NUCLEAR POWER DEMONSTRATING

[75] Inventors: Vahan V. Basmajian, Billerica; Charles W. Haldeman, Concord, both of Mass.

[73] Assignee: Megatech Corporation, Billerica, Mass.

[21] Appl. No.: 866,996

[22] Filed: Jan. 5, 1978

[51] Int. Cl.² ............................................. G09B 23/20
[52] U.S. Cl. ...................................................... 35/10
[58] Field of Search ................................. 35/1, 10, 13

[56] References Cited
U.S. PATENT DOCUMENTS 3,082,546  3/1963  Van Baerle ............................ 35/10

Primary Examiner—Harland S. Skogquist
Attorney, Agent, or Firm—Charles Hieken

[57] ABSTRACT

Apparatus for demonstrating the operation of a closed loop nuclear steam electric generating plant includes a transparent boiler assembly having immersion heating elements, which may be quartz lamps or stainless steel encased resistive immersion heating units with a quartz iodide lamp providing a source of visible radiation when using the encased immersion heating units. A variable voltage autotransformer is geared to a support rod for simulated reactor control rods for controlling the energy delivered to the heating elements and arranged so that when the voltage is high, the rods are withdrawn from the boiler to produce increased heating and illumination proportional to rod position, thereby simulating nuclear reaction. A relief valve, steam outlet pipe and water inlet pipe are connected to the boiler with a small stainless steel resistive heating element in the steam outlet pipe providing superheat. This heater is connected in series with a rheostat mounted on the front panel to provide superheat adjustments and an interlock switch that prevents the superheater from being energized when the steam valve is off with with no flow through the superheater. A heavy blue plastic radiation shield surrounds the boiler inside a bell jar.

10 Claims, 11 Drawing Figures

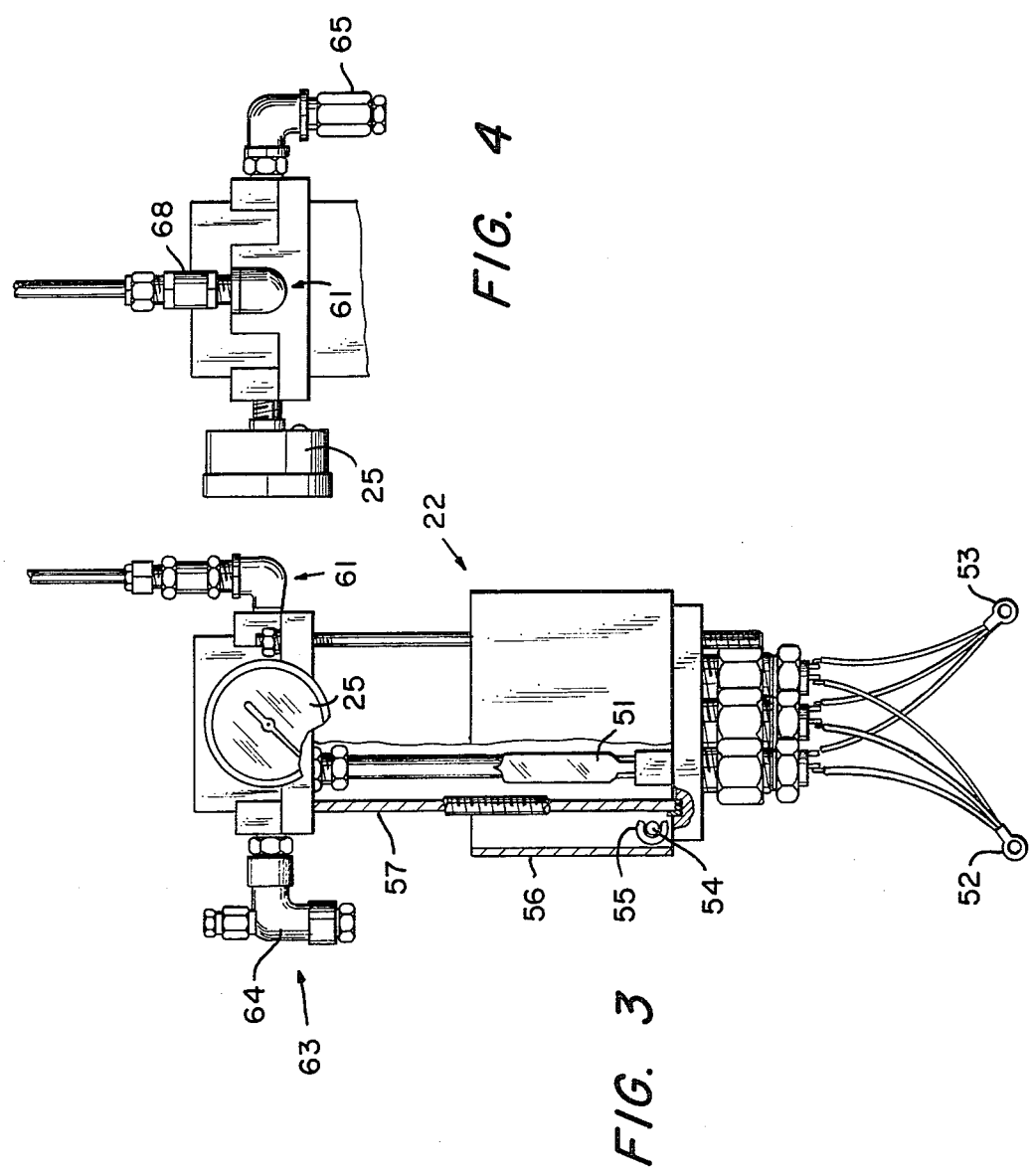

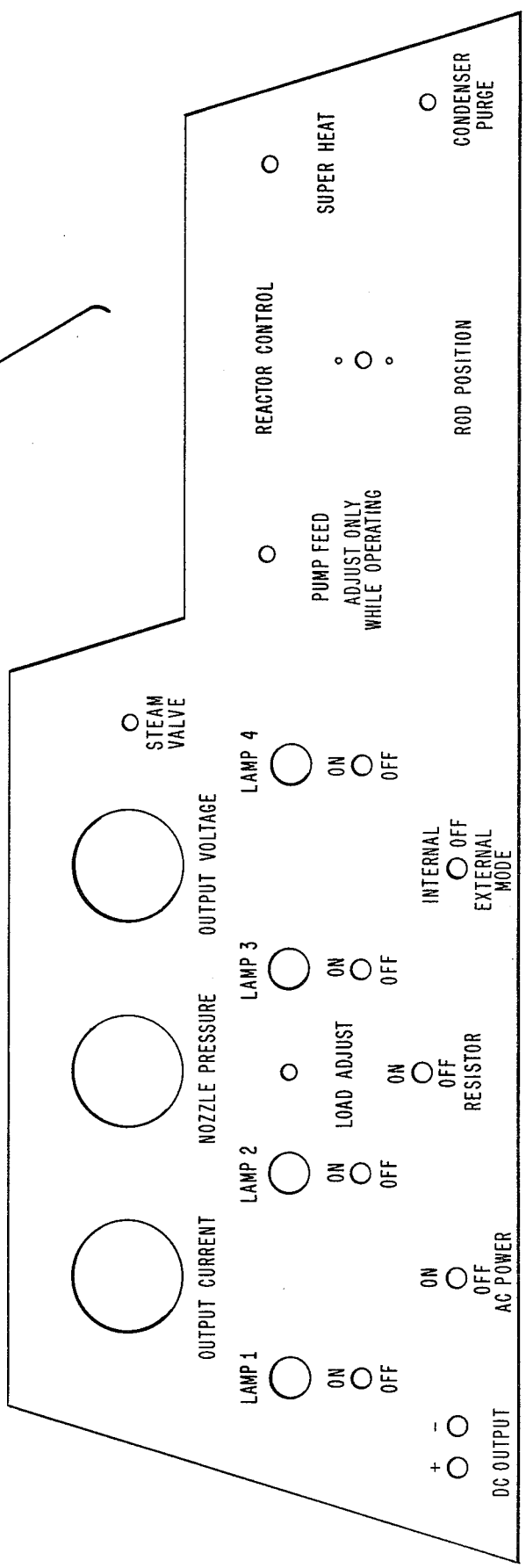
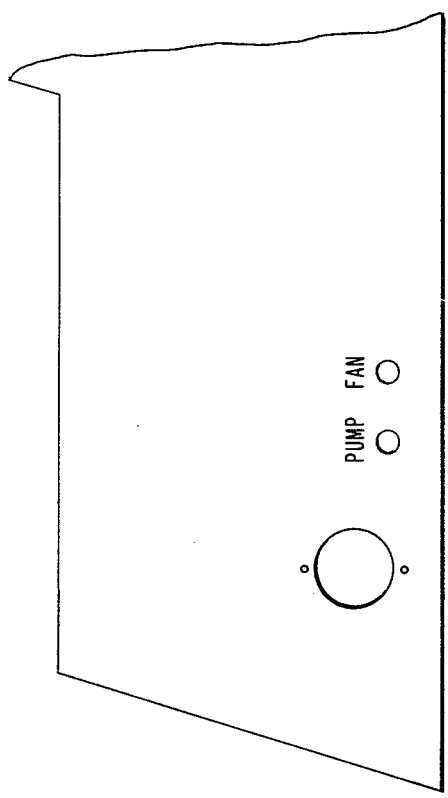
FIG. 11

4,216,593

NUCLEAR POWER DEMONSTRATING

BACKGROUND OF THE INVENTION

The present invention relates in general to nuclear power demonstrating and more particularly concerns novel apparatus and techniques for demonstrating the operation of a closed loop nuclear steam electric generating plant in a manner that enables a student to safely observe and experiment with a simulation of a closed loop nuclear steam electric generating plant to better understand the principles of operation while observing the effects of various system controls.

It is an important object of the invention to provide apparatus and techniques for demonstrating nuclear power.

It is another object of the invention to achieve the preceding object while demonstrating the operation of a closed loop nuclear steam electric generating plant.

It is a further object of the invention to achieve one or more of the preceding objects while simulating the results and effects of a real plant safely.

It is a further object of the invention to achieve one or more of the preceding objects while allowing a student to operate controls that simulate occurrences in a real plant and the results of these occurrences.

It is a further object of the invention to achieve one or more of the preceding objects while allowing a student to observe these effects.

SUMMARY OF THE INVENTION

According to the invention, there is means including a transparent wall defining a boiler having heating elements therein and an electrical light source, which may also comprise the heating means, and means for electrically controlling the energy delivered to the heating means and the light source while simultaneously controlling the position of simulated pile rods in a simulated reactor so that withdrawing the pile rods from the boiler results in delivering more electrical energy to the heating elements and the light source to increase both heat and illumination and thereby simulate nuclear reaction whereby the reaction increases as pile rods are withdrawn. Preferably, the control means comprises a variable voltage autotransformer having its shaft mechanically connected to means for controlling the position of the simulated reactor pile rods. Preferably, there is a turbine assembly having a transparent casing facilitating observation of the turbine steam nozzle and wheel that receives steam from the boiler through a pipe having superheating means and a control valve with an associated interlock that disables the superheating means when the control valve is closed.

Numerous other features, objects and advantages of the invention will become apparent from the following specification when read in connection with the accompanying drawing in which:

BRIEF DESCRIPTION OF THE DRAWING

FIG. 3 is a view partially in section of the boiler assembly according to the invention;

FIG. 4 is a side view of the top portion of the assembly of FIG. 3;

FIG. 11 shows the control panel.

DETAILED DESCRIPTION OF PREFERRED EMBODIMENTS

Figure 1:
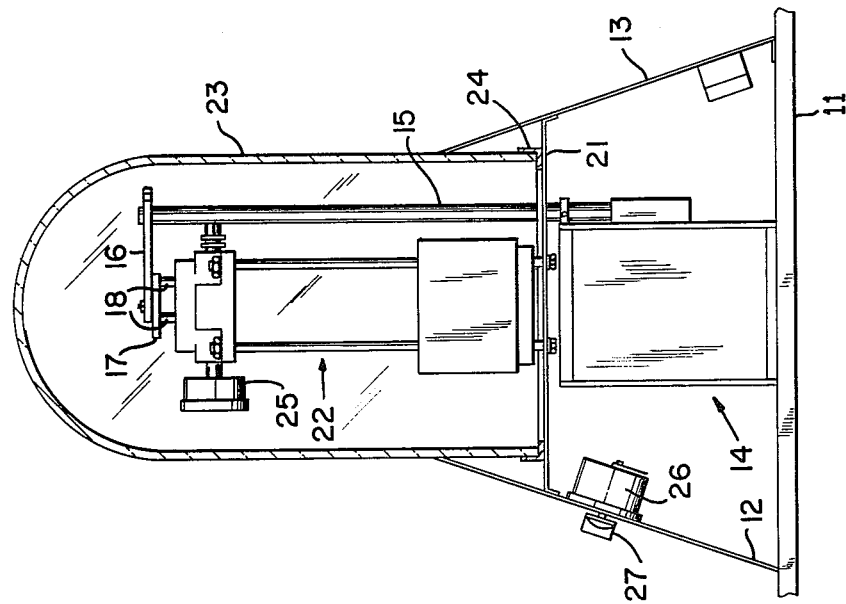
FIG. 1 is a pictorial view partially in section showing the relationship of a number of parts of the system.

With reference now to the drawing and more particularly FIG. 1 thereof there is shown a pictorial view partially in section of the boiler end of a system according to the invention. A base 11 supports sloping panels 12 and 13 and a variable voltage autotransformer assembly 14 mechanically coupled to a rod lifter 15 to raise rod lift arm 16 and depending rod plate 17 and pile rods 18 when the variable voltage autotransformer arm is rotated to provide increasing voltage.

A chassis plate 21 supports boiler assembly 22 covered by inverted bell jar 23 cushioned at the bottom with a bell jar gasket 24. A pressure gauge 25 indicates the pressure in the boiler.

Figure 2:
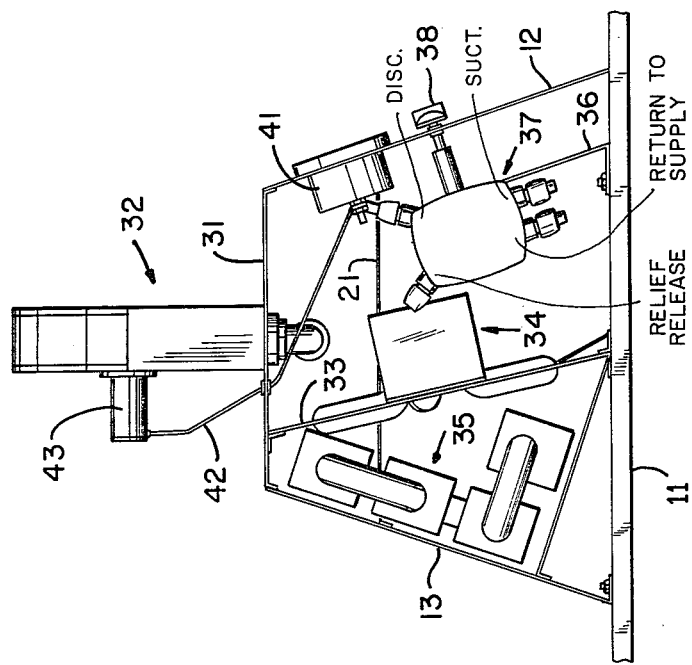
FIG. 2 is an end pictorial representation largely in section illustrating the relationship of a number of elements.

Sloping panel 12 supports a rheostat 26 operated by knob 27 to control the energy delivered to a superheater. Referring to FIG. 2, there is shown a pictorial representation of the arrangement of certain components seen essentially from the turbine end opposite that of the boiler end seen in FIG. 1. In FIGS. 1 and 2 certain components carried by panels 12 and 13 better seen in one view are not shown in the other view to more clearly illustrate the arrangement of the different elements. Panels 12 and 13 support a top panel 31 which supports turbine assembly 32. An inside sloping panel 33 supports fan assembly 34 which blows air across condenser 35. Another inside sloping panel 36 helps support a pump assembly 37 whose pumping rate is controlled by knob 38. A meter 41 is supported in sloping panel 12 and connected by a wire 42 to D.C. generator 43 driven by turbine assembly 32. The meter and control arrangement is shown best in FIG. 11, a front view of panel 12.

Referring to FIG. 3, there is shown a view partially in section of boiler assembly 22. This assembly includes three heating elements, which may be quartz lamps such as 51 connected in parallel to terminals 52 and 53, or alternatively may comprise stainless steel encased resistive immersion heating units of about 500 watts capacity each. Then a 250 watt quartz iodide lamp 54 may be located inside blue plastic thick radiation shield 56 and outside the transparent wall, typically heat-resistive glass 57 of the boiler to illuminate the boiler within a reflector 55, lamp 54 being connected to terminals 52 and 53. At the top of the boiler is pressure gauge 25, input plumbing 61 for receiving water and outlet plumbing 63 for delivering steam including superheater holder assembly 64.

Referring to FIG. 4, there is shown a side view of the top of the boiler assembly including the plumbing supporting check valve 65 and pressure relief valve 68.

Figure 5:
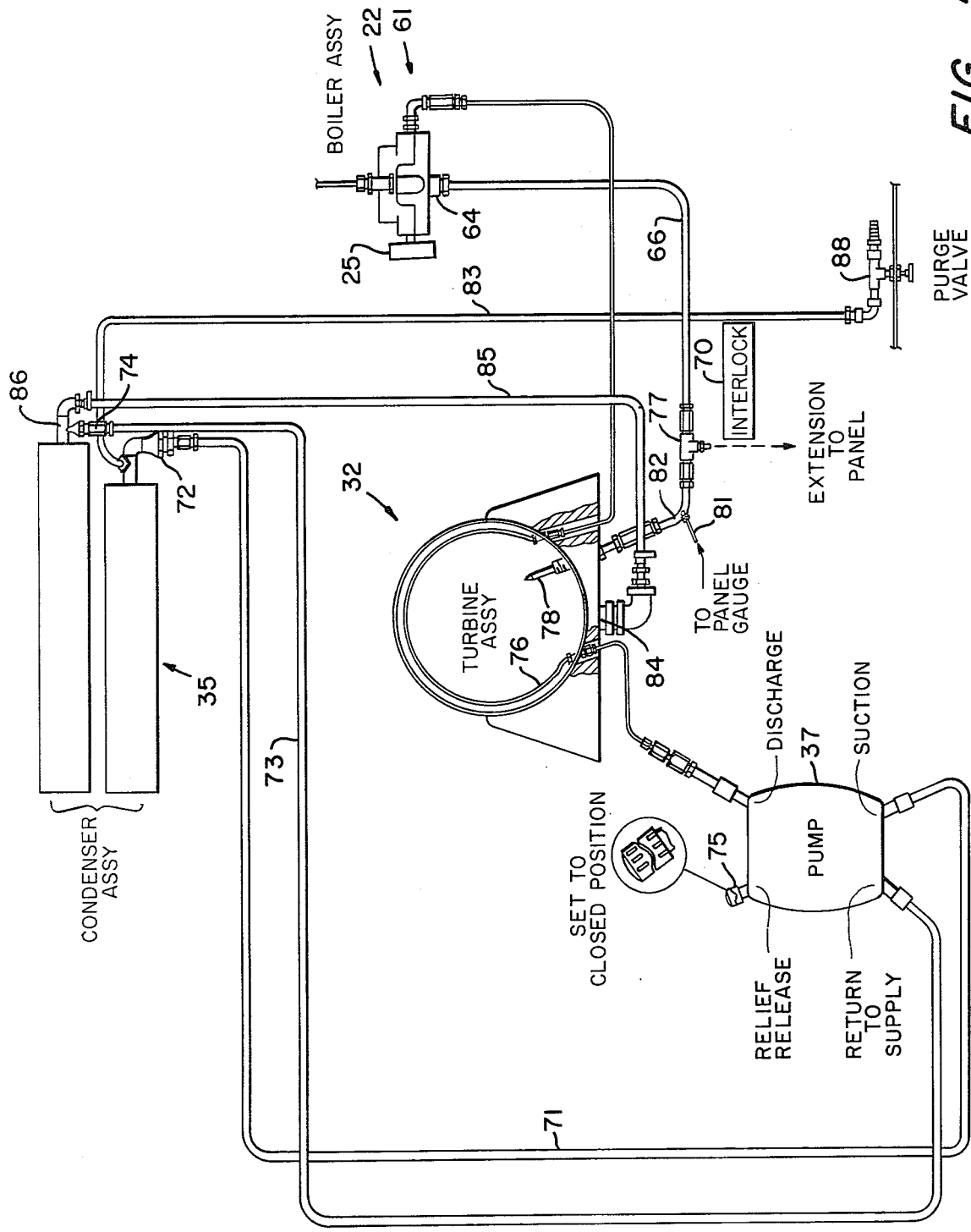
FIG. 5 is a piping assembly diagram of a system according to the invention.

Referring to FIG. 5, there is shown a diagram of the piping assembly in a system according to the invention. Pump 37 has its suction input connected by tubing 71 to a filter assembly 72 at the output of condenser 35. The return to supply input of pump 37 is connected by tubing 73 and a connector 74 to inlet 86 of condenser 35. A relief valve 75 is connected to the relief release port of pump 37. The discharge port of pump 37 is connected by appropriate connectors and tubing to a reheat coil 76, typically four turns of ⅛" copper tubing, for reheating the water that is returned from condenser 35 to the boiler assembly 22 through the path including tubing 76 and water inlet plumbing 61.

Steam from boiler assembly 22 superheated by the superheater in superheater holder 64 travels through tubing 66 through a shut-off valve 77 and other plumbing to nozzle 78 inside turbine 32.

Shut-off valve 77 is mechanically coupled to a panel for control therefrom by a suitable knob that also actuates an interlock 70 in series with rheostat 26 and the superheater in holder 64, all three of these elements being in series with the A.C. voltage so that the superheater in holder 64 is disabled when valve 77 is closed. Pressure gauge 25 is connected by tubing 81 to the elbow 82 of the steam line for providing an indication of nozzle pressure. A tube 83 connects the output of condenser assembly 35 to a purge valve 88 that may be used to purge air from the system as fresh water is added to the boiler or as steam enters the system at startup.

Steam from turbine assembly 32 exits through outlet 84 and is delivered by plumbing including tubing 85 to the inlet 86 of condenser assembly 35 for condensation and return to boiler assembly 32 through pump 37 and reheat tubing 76.

Figure 6:
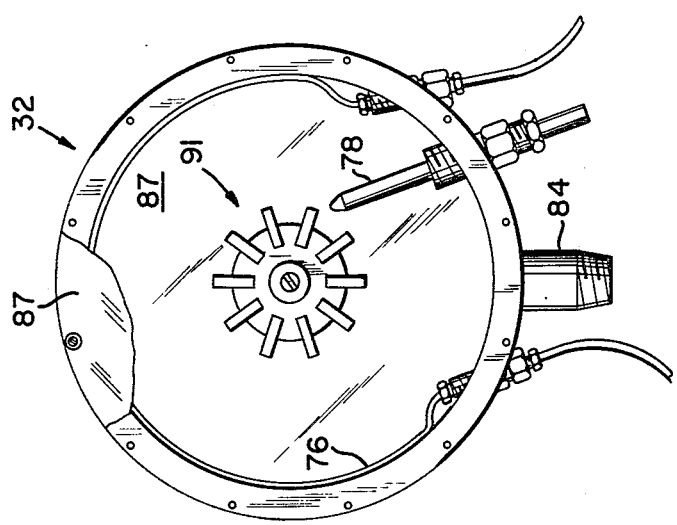
FIG. 6 is a plan view of the turbine assembly.

Referring to FIG. 6, there is shown a plan view of turbine assembly 32 with one polycarbonate end plate 87 cut away, these end plates being transparent so that operation of the turbine may be observed. Turbine assembly 32 includes a turbine wheel 91 driven by steam from nozzle 78.

Figure 7:
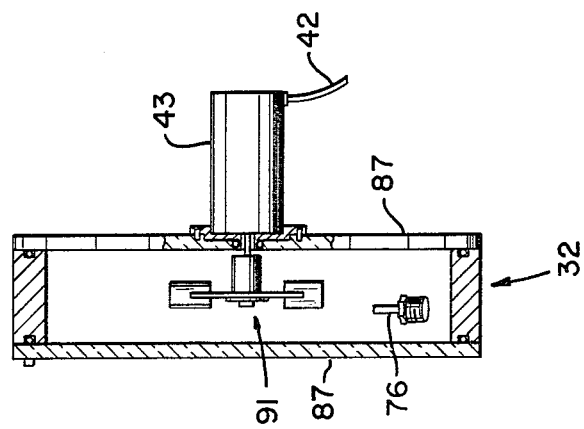
FIG. 7 is a view essentially in section of a portion of the turbine asembly of FIG. 6 as viewed from the side.

Referring to FiG. 7, there is shown a side essentially sectional view of turbine assembly 32 showing D.C. generator 43 coupled to the shaft of turbine wheel 91 to produce electrical energy delivered by wire 42.

Figure 10:
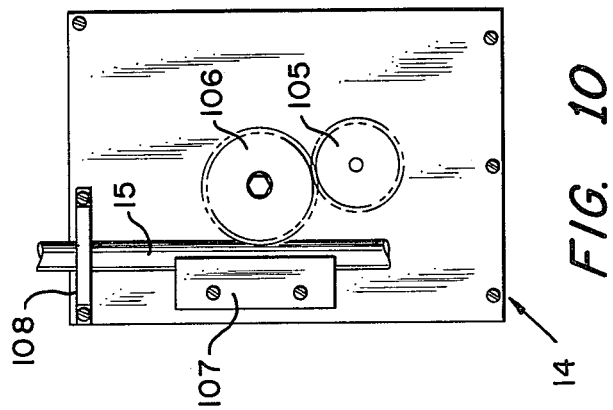
FIGS. 8–10 are elevation, plan and rear views, respectively, of the electrical energy control and pile rod position control.
Figure 9:
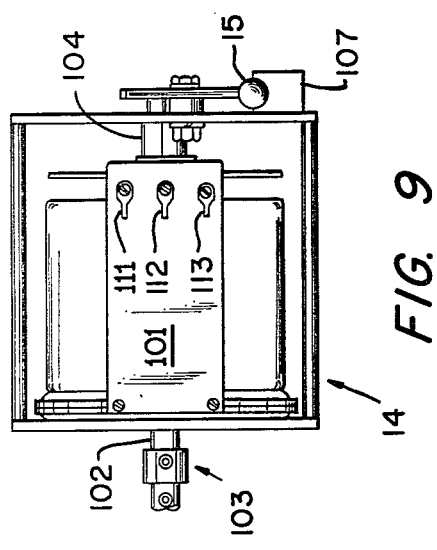
Figure 8:
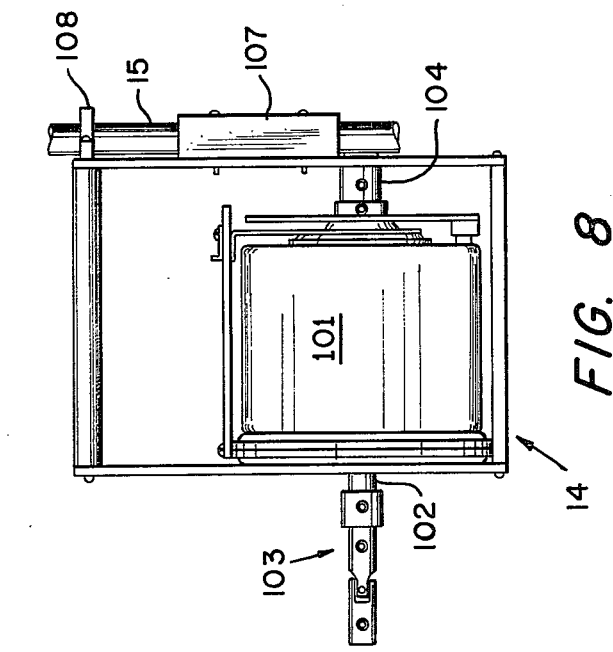

Referring to FIGS. 8–10, there are shown elevation, plan and rear views, respectively, of variable voltage transformer assembly 14. The variable voltage autotransformer 101 is controlled from the front as its shaft 102 is rotated and connected to a universal adapter 103 so that its setting may be controlled from a knob on a panel. The rear of the shaft 102 is connected by a gear adapter 104 to gears 105 and 106 (FIG. 10) to move rod lifter 15 guided by rod guide 107 and rod support 108, rod 15 functioning as a rack so that rotation of transformer shaft 102 to cause an increase in output voltage causes rod lifter 15 to rise and thereby lift pile rods 18 (FIG. 1). As best seen in FIG. 9, variable voltage autotransformer 101 has three terminals 111, 112 and 113, terminal 112 being connected to the arm of the transformer and being connected to terminal 52 while one of terminals 111 and 113 is connected to terminal 53, terminals 111 and 113 being connected to the 110 volt A.C. line so that the voltage between terminals 52 and 53 increases as transformer shaft 102 is rotated to cause a rise in rod lifter 15.

The invention thus provides a means for allowing study of a simulated closed-loop nuclear steam electric generating plant in which the student may operate a number of controls. When voltage is increased, pile rods 18 are withdrawn, and the electrical light source illuminating the boiler increases the illumination in proportion with rod position, thereby simulating nuclear reaction while also increasing boiler heat to increase the heat energy generated and allow visual relationship between a nuclear reaction and the positon of a pile rod. The pump control knob 38 on the control panel allows adjustment of boiler feed rate and water level. FIG. 11 shows the control panel having a voltmeter, ammeter and switching circuit for loading generator 43 with lamps or a variable resistor.

Safety relief valve 68 is located inside bell jar 23 to facilitage observation of any leakage issuing from the valve to indicate that the operating pressure has been exceeded and signal the student to reduce pressure by, for example, lowering the voltage and the rods. The heavy blue plastic radiation shield 56 attenuates the glare from the lamps and enhances the feeling of intense radiation energy generation.

There has been described novel apparatus and techniques for educating on the operation of a closed-loop nuclear steam electric generating plant. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Nuclear power simulating apparatus comprising,
    means including a transparent cylinder defining a boiler having input plumbing for receiving water to be heated and converted into steam and outlet plumbing for delivering the steam;
    electrical immersion heating elements inside said boiler for heating water therein and converting it into steam,
    means including a mechanically controllable electrical energy source for controlling the energy delivered to said heating elements and thereby the rate at which water therein is converted into steam,
    simulated pile rods inside said boiler, and
    means for mechanically coupling said mechanically controllable source to said simulated pile rods so that increasing the energy delivered to said heating elements is accompanied by withdrawal of said pile rods from said boiler by a distance proportional to the energy delivered to said heating elements and increase in the rate at which water is converted into steam.

2. Nuclear power simulating apparatus in accordance with claim 1 and further comprising means for electrically illuminating said boiler, and means for coupling the latter to said mechanically controllable electrical energy source so that the intensity of illumination of said boiler is also proportional to the degree of withdrawal of said pile rods from said boiler.

3. Nuclear power simulating apparatus in accordance with claim 2 wherein said heating elements also comprise said means for electrically illuminating.

4. Nuclear power simulating apparatus in accordance with claim 2 wherein said means for electrically illuminating comprises a quartz iodide lamp in reflecting means outside said boiler.

5. Nuclear power simulating apparatus in accordance with claim 4 and further comprising a transparent colored heavy plastic radiation shield surrounding said boiler and said means for electrically illuminating.

6. Nuclear power simulating apparatus in accordance with claim 1 wherein said means including a mechanically controllable electrical energy source for controlling the energy delivered to said heating elements comprises a variable voltage transformer having a rotatable control shaft, and said means for mechanically coupling said mechanically controllable source to said simulated pile rods comprises rod lifting means connected to said pile rods and rotatable driving means mechanically connected to said control shaft for driving said rod lifting means so that rotation of said control shaft causes an increase in energy delivered to said heating elements and the rise of said rod lifting means and said pile rods.

7. Nuclear power simulating apparatus in accordance with claim 6 wherein said rotatable driving means is connected to the rear of said control shaft and further comprising, a knob connected to the front of said control shaft accessible to a user of said apparatus.

8. Nuclear power simulating apparatus in accordance with claim 7 wherein said driving means comprises gear means for engaging a rack connected to the rear of said control shaft by a universal coupling, and said rod lifting means is formed with teeth engaging the teeth in said gear means and functioning as a rack.

9. Nuclear power simulating apparatus in accordance with claim 1 for demonstrating the operation of a closed loop nuclear steam electric generating plant and further comprising, a closed loop steam turbine system having an inlet connected to said outlet plumbing and an outlet connected to said input plumbing.

10. Nuclear power simulating apparatus in accordance with claim 9 and further comprising a resistive heating element in said outlet plumbing for providing superheat, means including a rheostat accessible to a user of said apparatus for delivering electrical energy to said resistive heating element and providing superheat adjustments and an interlock switch for preventing said resistive heating element from being energized in the absence of steam flow through said outlet plumbing, and a steam valve controllable by a user of said apparatus and connected to said interlock switch for selectively controlling the flow of steam in said outlet plumbing and opening said interlock switch when the steam valve is off with no steam flow through said outlet plumbing.

* * * * *